United States Patent [19]

Voigt et al.

[11] 4,317,808
[45] Mar. 2, 1982

[54] PROCESS FOR THE PRODUCTION OF HYDROGEN CYANIDE

[75] Inventors: Carl Voigt, Rodenbach; Hans Strack, Alzenau; Peter Kleinschmit, Hanau, all of Fed. Rep. of Germany

[73] Assignee: Degussa Aktiengesellschaft, Frankfurt am Main, Fed. Rep. of Germany

[21] Appl. No.: 208,026

[22] Filed: Nov. 18, 1980

[30] Foreign Application Priority Data

Nov. 24, 1979 [DE] Fed. Rep. of Germany ....... 2947498

[51] Int. Cl.³ .............................................. C01C 3/02
[52] U.S. Cl. ....................................... 423/375; 55/68; 55/70; 55/75
[58] Field of Search ............... 55/70, 75, 68; 423/375, 423/376, 236, 238

[56] References Cited

U.S. PATENT DOCUMENTS

| | | | |
|---|---|---|---|
| 2,995,423 | 8/1961 | Breck et al. | 55/75 |
| 3,112,177 | 11/1963 | Fujise et al. | 423/375 |
| 3,184,518 | 5/1965 | Sanders et al. | 55/75 |
| 3,255,233 | 6/1966 | Kunze et al. | 423/376 |
| 3,508,382 | 4/1970 | Schoofs et al. | 55/75 |
| 3,517,484 | 6/1970 | Lee et al. | 55/75 |
| 3,719,026 | 3/1963 | Sand | 55/75 |
| 3,732,326 | 5/1973 | Chen | 55/75 |
| 4,056,370 | 11/1977 | Heinze et al. | 55/68 |

FOREIGN PATENT DOCUMENTS 2046233 11/1980 United Kingdom ................ 423/376

OTHER PUBLICATIONS

Brooking et al., "The Specification of Molecular Sieve Adsorption Systems", *The Chemical Engineer*, Jan. 1972, pp. 13–18.
"Selective Adsorption with Zeolites", *Chemical and Engineering News*, vol. 32 (Dec. 29, 1954), p. 4786.
"Molecular Sieves, Processing Tool of the Future", *The Refining Engineer* (Feb. 1957), p. C-53.

*Primary Examiner*—O. R. Vertiz
*Assistant Examiner*—Wayne A. Langel
*Attorney, Agent, or Firm*—Cushman, Darby & Cushman

[57] ABSTRACT

For the reduction of the ammonia content in the product gas of the hydrocyanic acid-methane-ammonia (BMA) process and accordingly to increase the yield the reaction gas mixture of this process is brought into contact with zeolite and the ammonia thereafter desorbed from the zeolite preferably again employed in the reaction step. If the desorption is carried out with a flushing gas such as the hydrocarbon used in the reaction then this mixture can be directly supplied again to the BMA reactor. Through this procedure the amount of ammonia previously lost to the process can again be made useful in the process itself.

25 Claims, 2 Drawing Figures

4,317,808

PROCESS FOR THE PRODUCTION OF HYDROGEN CYANIDE

BACKGROUND OF THE INVENTION

The so-called BMA process (hydrocyanic acid-methane-ammonia process) for the production of hydrogen cyanide or hydrocyanic acid starts out from methane and ammonia and operates in the absence of oxygen or air.

According to German patent application No. P2913925.1-41 and related Voigt U.S. application Ser. No. 133,358 filed Mar. 24, 1980, it has already been proposed to employ liquified gas, e.g. propane, n-butane, i-butane or mixtures of two or more of them, in place of methane. The entire disclosure of Voigt is hereby incorporated by reference and relied upon.

The reaction itself is carried out in suspended reaction tubes made of sintered aluminum oxide which are internally coated with a platinum catalyst.

Since the reaction proceeds endothermally, the reaction tubes are heated and thereby there are obtained reaction temperatures of around 1300° C. In order to avoid the occurrence of reverse reaction the hydrogen cyanide containing gas mixture formed must be cooled off quickly to a temperature below 400° to 300° C. this takes place in a water cooled chamber made of aluminum in the top of the furnace itself, see Ullmann, Enzyklopädie der technischen Chemie, 4th edition, Vol. 9, pages 659–660; Dechema-Monografie, 1959, No. 33, pages 28–46 and also German Pat. No. 959,364.

In carrying out the so-called BMA process it has been shown that a certain part of the ammonia employed in the reactor is lost with the gaseous product.

This non-reacted part of ammonia is lost for the production of hydrogen cyanide since the ammonia in customarily was washed out of the gaseous product with sulfuric acid and a working up of the ammonia sulfate thus recovered in order to recover the ammonia therefrom was much too expensive industrially and therefore uninteresting.

The other known processes for removal of ammonia from gaseous mixtures, as e.g. with aqueous solutions, acid acting absorption agents such as acid salts of phosphoric acid or lower fatty acids or the removal of ammonia with specific boric acid complexes, with solutions of ammonium nitrate or with urea as well as with specific heavy metals salts also cannot solve all of the problems of an easy recovery of the ammonia, see German Pat. No. 1191347.

Of course it is known that adsorption methods for the removal of ammonia from gaseous streams also are suited but with longer sorption of hydrogen cyanide containing gases there is a partially polymerization or decomposition of the hydrogen cyanide in the gas stream. Therefore customary sorption agents such as activated carbons or silica gel cannot be used, see Gmelin, Vol. 14 C [D 1], pages 218–220, particularly page 219 and R. F. Barrow et al in J. Chem. Soc., 1947, pages 401–416.

Thus it appeared that the residual ammonia leaving with the gaseous product was lost for the BMA process itself.

This situation was most unsatisfactory.

The object of the invention is to develop an industrially simple process for the recovery of ammonia within the so-called BMA process in which the so recovered ammonia can again be returned into the reactor.

SUMMARY OF THE INVENTION

It has now been found that the ammonia found in the gaseous product of the BMA process after leaving the reaction furnace can be recovered again in a simple manner if the gaseous product which consists essentially of hydrogen cyanide, hydrogen, unreacted hydrocarbon, preferably methane, and ammonia, as well as small amounts of nitrogen, carbon monoxide and in a given case water, is brought into contact with a zeolite and the ammonia adsorbed thereon is recovered again in a desorption step.

The hydrocarbon is preferably a $C_1$–$C_4$ hydrocarbon, e.g. methane, ethane, propane, n-butane or isobutane or a mixture of two or more such hydrocarbons.

As zeolites there are meant, e.g. commercial zeolites of the structural types A, X, Y and P, see D. W. Breck, CEP October 1977, pages 44–48. However, there can also be used natural zeolites such as mordenite, clinoptilolite and erionite, see Breck loc. cit. The entire disclosure of Breck is hereby incorporated by reference and relied upon.

These zeolites can be arranged, e.g. in adsorption apparatuses, such as adsorption towers and adsorption columns, in which the adsorption takes place at about 20°–200° C., preferably at 30°–100° C.

Preferably these adsorption units are connected parallel so that after exhaustion of one unit and switching on the other unit or units the desorption can begin at 40°–400° C. Preferably the desorption occurs at 200°–400° C.

Furthermore, it was found that the adsorption units which are filled with the corresponding type of zeolite or mixtures of different types of zeolites, are so built into the known BMA unit that the ammonia obtained after the desorption can immediately be returned again into the reaction step for the production of hydrogen cyanide, see FIG. 1.

It is especially favorable to carry out the desorption with simultaneous flushing with a flushing gas such as methane or one of the other hydrocarbons used in the reaction to form hydrogen cyanide and to again lead back into the reaction step the thus formed mixture of ammonia and the hydrocarbon in question.

The process can comprise, consist essentially of or consist of the steps set forth with the stated materials.

DETAILED DESCRIPTION

Figure 1:
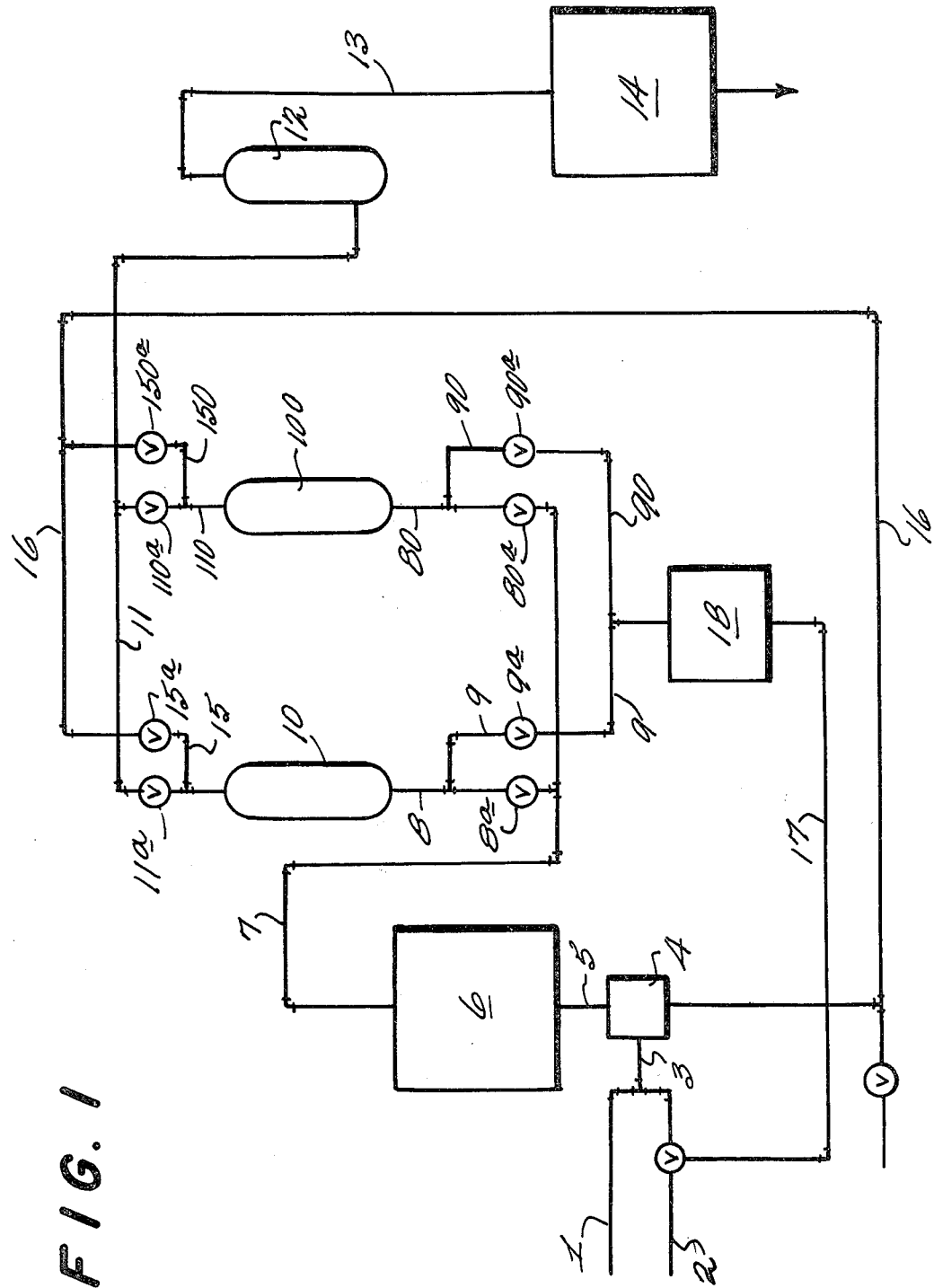
FIG. 1 is a diagramatic illustration of an apparatus for carrying out the process of the invention.

In FIG. 1, the process of the invention is described in an example with two parallel connected adsorbers. The desorption can be carried out both by simple increase in temperature and additionally by use of a hydrocarbon as flushing gas, especially advantageous is the same as hydrocarbon which is employed as the reactant with ammonia.

As flushing gas, however, there can be used other gases, as e.g. air, nitrogen, carbon monoxide, carbon dioxide, noble gases, e.g. argon or neon, or hydrogen.

The ammonia-flushing gas obtained thereby then must be worked up to ammonia, e.g. by condensation.

Or this mixture of ammonia and flushing gas is led into the burner of the BMA reaction furnace, through which there is advantageously produced additional heat for the synthesis process by combustion.

Referring more specifically to FIG. 1 of the drawings there is led in ammonia via line 1 and the hydrocarbon, e.g. methane, via line 2 and the mixture is then led via line 3 into the mixer 4 and goes from there via line 5 into the reaction furnace 6 of the hydrocyanic acid-methane-ammonia process.

The reaction gas leaves the reaction furnace 6 via line 7 and passes, e.g. via line 8 with valve 8a into the adsorption vessel 10 which is filled with one of the zeolites mentioned above. The practically ammonia free reaction gas leaves the adsorber via line 11 and is led into the lower part of the washer 12 which is preferably filled with 5-95 weight % sulfuric acid. The gas escaping at the top of the washer 12 is led via line 13 into a conventional condenser 14 and the hydrogen cyanide is liquified. The not liquified gaseous portion consists predominantly of hydrogen and can be used for other synthetis purposes.

The adsorption and desorption can be carried out according to several methods as are described, e.g. in Breck, loc. cit.

There has proven especially suitable desorption by applying a vacuum (pressure-swing) or desorption with the help of flushing gases with simultaneous increase of the temperature.

If the desorption of the adsorber 10 is only carried out by a corresponding increase in temperature with applied vacuum, e.g. with 300° C., then the first adsorbed material, chiefly ammonia, escapes, after closing valves 8a and 11a as well as opening valve 15a via line 15 into line 16 and is returned from here into the mixer 4.

The desorption is carried out in adsorber 10 in an especially advantageous manner if in addition to the increase in temperature, the desorption is carried out with the help of a flushing gas, i.e., preferably with the hydrocarbon used as the reaction partner for ammonia, as e.g. methane. In this case a corresponding portion of the hydrocarbon is supplied via line 17 into the heater 18 and from there after reaching the desorption temperature is led via line 9, valve 9a and the remaining part of line 8 into the adsorber 10.

The ammonia escaping with the flushing gas at the top of the adsorption vessel likewise goes via line 15, valve 15a and line 16 into the mixing vessel 4 and there is mixed with the freshly arriving ammonia and hydrocarbon.

It is possible either to so select the amount of flushing gas that the desorbed mixture has the same composition as that which has newly entered into the reaction furnace; or else a subsequent regulation in mixing vessel 14 is necessary.

The second adsorber 100 connected in parallel has the same functions as adsorber 10, likewise the lines 80, 90 and 150 and the valves 80a, 90a and 150a have these same functions as the lines 8, 9 and 15 respectively the valves 8a, 9a and 15a.

Of the two adsorbers 10 and 100 connected parallel, one as customary, laden while the other is desorbed.

It goes without saying that more than two adsorbers can also be connected in parallel.

Also the stepwise process is possible with only one adsorber, although the continuous process is preferably carried out with at least two adsorbers.

Should an increase in temperature be avoided in the adsorption, the adsorbed material can be recovered, e.g. also through a customary reduction in pressure by lowering to 0.001 to 1 bar abs., preferably at 0.01-0.3 bar abs.

In FIG. 1 the flushing gas is sent through the absorber in direct flow. This is most highly recommended for the BMA-process, but in principle, a counter current supply of the washing gas is also possible, it is only decisive that the gaseous mixture obtained after the desorption can be returned into the mixer 4.

As to the type of flushing gas it should be noted that this can also be a gas which is not a hydrocarbon, especially if the ammonia obtained should not be returned into the BMA reaction step. Thus there can also be used other customary flushing gases such as hydrogen or air. The air should only then be employed if the desorbed gases are used for heating purposes or a direct working up to ammonia according to customary methods, e.g. through condensation takes place.

Previously it has not been tried to separate the troublesome ammonia from hydrogen cyanide by using molecular sieves.

In the literature there are found very different values for the molecular diameter from 2.6-5.7 Å for hydrogen cyanide and 2.6-4.1 Å for ammonia, see Gmelin loc. Cit. Still all values are present in comparable order of magnitude.

Therefore a separation based on the dimensions of the two molecules was not to be expected.

Furthermore, the dipole moments of the two materials to be separated also lie in the same order of magnitude, namely for hydrogen cyanide at 2.98D and for ammonia at 1.47D.

However, for the separatory activity of molecular sieves, as is known, among others both the molecular diameter as well as the dipole moment are decisive.

Thus it was completely unexpected that a gaseous mixture of predominantly hydrogen cyanide and a little ammonia could be separated with zeolites, Indeed in a way that the molecule of ammonia having the smaller dipole moment, which besides is present in a substantially smaller amount than the other type of molecule could be separated by selective adsorption on the mentioned molecular sieves from the equally large molecule of hydrogen cyanide, which, however, has a substantially higher dipole moment and constitutes a considerable portion of the gases to be separated.

The gaseous stream leaving the zeolites thus is always poor in ammonia, and with fixed temperatures and types of zeolite practically consists of hydrogen cyanide and traces of ammonia besides the inert gases. These small traces of ammonia can be removed in a sulfuric acid safety wash, whereupon the purified hydrogen cyanide containing gas can be condensed in known manner.

The sulfuric acid washer can be dimensioned smaller by a factor of 10 using the process of the invention compared to the washers in the existing BMA plants or while maintaining the customary dimensions, increasing the service life of the washer, e.g. around a factor of 10. In any case, the amount of ammonium sulfate resulting is reduced considerably.

The invention is described in more detail in the following examples.

TESTS CONDUCTED

In order to investigate the adsorption capacity and selectivity of different adsorption agents there was selected the following described research construction.

In a BMA laboratory apparatus consisting of a tubular furnace (not shown) in which there is located an original BMA catalyst tube, which opens in the upper end into a water cooled cooling head there is produced at 1250° C. starting from methane and ammonia a gaseous stream having the composition of HCN: 22-25%
$NH_3$: 2-5%
$H_2$: 70-75%
Traces of water, $CH_4$, $N_2$ (at about 1 mole HCN/h)

Figure 2:
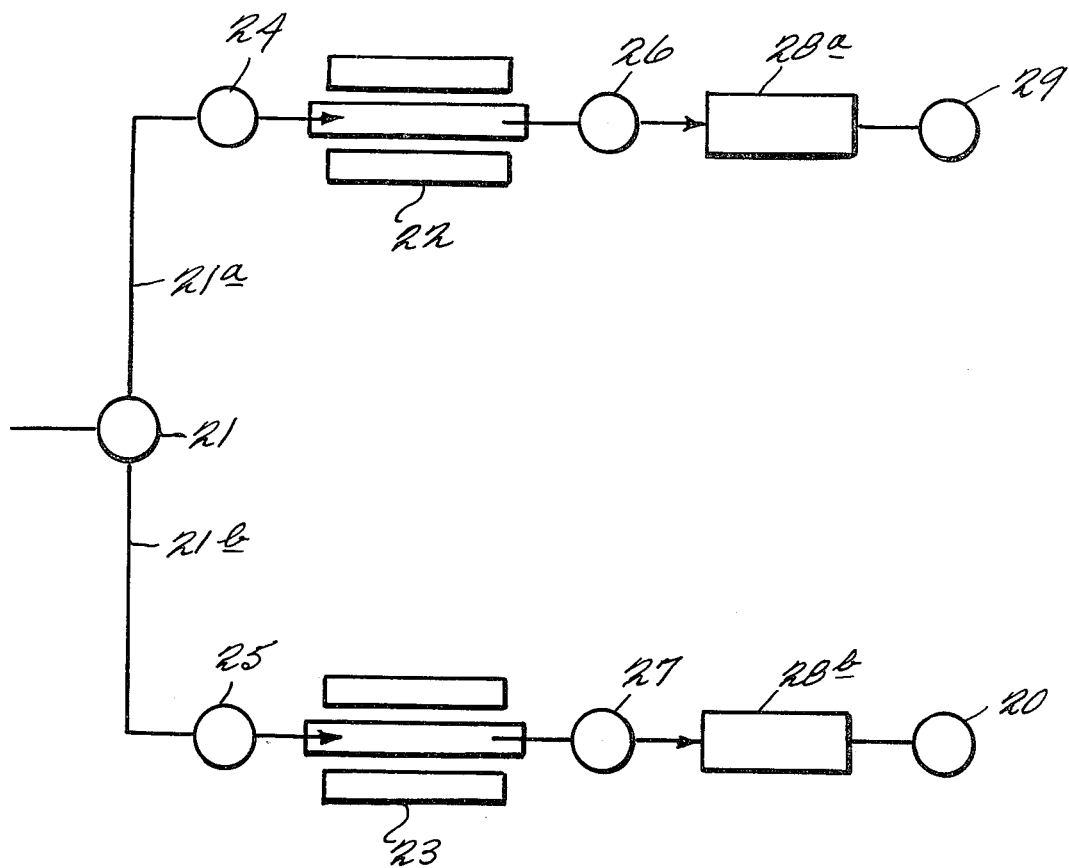
FIG. 2 is a diagramatic illustration of a test construction apparatus which can be used with the process of the invention.

The gaseous stream was divided into two equal gas streams at 21 (see FIG. 2) and led via lines 21a and 21b into the two parallel connected heatable adsorption chambers 22 and 23. The measurement of the amounts of gas took place at 24 and 25 via rotameters; the pressure was determined in the two manometers 26 and 27. In both adsorption chambers there is located a ceramic tube which in one case is filled with the zeolite to be tested (Experiment) and in the other case (standard) remained empty. Subsequently both the non-adsorbed ammonia was absorbed in sulfuric acid and the unchanged hydrocyanic acid absorbed in aqueous sodium hydroxide at 28a and 28b and analyzed according to the customary wet chemical methods. The amount of residual gas was determined at 29 and 20 with customary gas meters.

In order to determine the amounts of gas the zeolites were weighed before and after each experiment.

For regeneration the adsorption chamber was heated (maximum 400° C.) and the desorbed components led through the adsorption columns 28 and 28b with the help of washing gases (e.g. $CH_4$, $H_2$ or air) or through lowering the pressure. The desorbed portion of HCN and $NH_3$ is determined wet chemically as sodium cyanide and ammonium sulfate by titration or according to Kjeldahl.

The results of the different experiments are collected in Table I.

Column 1 gives the Experiment number. The next three columns designate the types of zeolite (II), the amount of adsorption agent (III) and the adsorption temperature (IV). The analytically determined values (in grams) of ammonia and hydrocyanic acid after the adsorption chamber are given for the empty tube in column V and for the tube filled with the corresponding adsorbent in column VI. From the difference between columns V and VI there can be calculated the percentage of adsorbed hydrocyanic acid and ammonia (Column VII).

Besides the zeolites in the Experiments 24, 25 and 26, 27 there were tested illustratible commercial silica gel or activated carbon as adsorption agent, whereby in both cases there was observed a strong polymerization of the hydrocyanic acid on the surface.

Zeolites of types Y and P are mentioned in Table 1 in order to show that the principle of the separation of ammonia and hydrogen cyanide by zeolites is not limited to the zeolites of types A and X. However, preferably suited for an industrial carrying out of the process of the invention are the zeolite types A and X and especially preferred the zeolite type A.

The zeolites tested in the examples were either produced according to one of the following preparations (designated by *) or there were used commercial zeolites.

The * designated preparations were carried out for zeolite A according to German Pat. No. 1038017 (and related Milton U.S. Pat. No. 2,882,243), for zeolite X according to German Pat. No. 1,038,016, for zeolite Y according to German Pat. No. 1,098,929 and for zeolite P according to Milton U.S. Pat. No. 3,008,803. The formation took place for example according to German Pat. No. 1164995.

In experiments 1-23 there were always used fresh zeolite samples, which previously were activated at 400° C. for 2 hours in the furnace.

The comparison samples in experiments 24-27 were dried at 120° C. before beginning the experiment.

In experiments 28-33 the separation results from zeolite type A are set forth in which there already had been carried out five adsorption-desorption cycles and whose regeneration was carried out according to one of the following methods.

FOR EXAMPLES 28 AND 29

Zeolite A was treated at 400° C. in an air stream (50 l/h) for 3 hours and subsequently employed.

FOR EXAMPLE 30

Zeolite A was treated at 400° C. in a muffle furnace without flushing gas for 2 hours and employed.

FOR EXAMPLE 31

Zeolite A was treated at room temperature in a vacuum (<0.1 bar abs.) for 2 hours and employed.

FOR EXAMPLES 32 AND 33

Zeolite A was treated at 200° C. for 2 hours with 50 liters of hydrogen/h or 50 liters of methane/h and employed.

According to experiment 32 there was obtained a gas mixture which besides ammonia still contains a little hydrogen cyanide, but through flushing with methane also contained a portion of the important hydrocarbon for the BMA synthesis and therefore is preferably suited for the direct return into the BMA reactor.

As is customary the strength of the adsorption depends on the operating temperature in each case with a specific zeolite type.

From Table 1 it can be seen that for the types X and A the best separatory effect occurs, i.e. the strongest adsoprtion of ammonia, with values over 90% of the amount of ammonia originally present in the gas, at about 30° C.

EXAMPLE 34

Return of Ammonia

Similar to examples 28-29 the regeneration of the molecular sieve laden with ammonia took place at 300° C. with air (40 l/h) as flushing gas.

Subsequently, for removal of small amounts of coadsorbed hydrocyanic acid the gaseous mixture was led through aqueous sodium hydroxide and then the ammonia frozen out in a cooling trap at −78° C. This permits the ammonia to be directly reused for the production of hydrocyanic acid, if the cooling trap is intermediately connected in the ammonia-synthesis gas line. The demand for fresh ammonia for the hydrogen cyanide synthesis through this is reduced by the portion of $NH_3$ recovered in the preceding adsorption-desorption cycle.

In this example, the already high yield of ammonia increased compared to the parallel experiments without return from the average of 83% to 91%.

TABLE 1

| I | II Zeolite Type | III Amount (g) | IV Temp. Ads. (°C.) | V Standard HCN (g) | V Standard NH₃ (g) | VI Experiment HCN (g) | VI Experiment NH₃ (g) | VII Adsorption on Zeolite % HCN | VII Adsorption on Zeolite % NH₃ |
|---|---|---|---|---|---|---|---|---|---|
| 1 | Zeolite P* | 12 | 400 | 13.72 | 0.33 | 13.07 | 0.34 | 4.7 | 0 |
| 2 | " | 12 | 300 | 13.78 | 0.32 | 13.11 | 0.32 | 4.8 | 0 |
| 3 | " | 12 | 200 | 13.94 | 0.39 | 13.53 | 0.37 | 2.9 | 5.1 |
| 4 | " | 12 | 100 | 13.77 | 0.36 | 13.06 | 0.33 | 5.1 | 8.3 |
| 5 | " | 12 | 30 | 13.60 | 0.65 | 13.12 | 0.57 | 3.6 | 12.3 |
| 6 | " | 45 | 30 | 13.67 | 0.36 | 12.74 | 0.24 | 6.8 | 33.3 |
| 7 | " | 44 | 100 | 13.84 | 0.22 | 12.74 | 0.17 | 7.9 | 22.7 |
| 8 | " | 45 | 200 | 13.74 | 0.39 | 12.56 | 0.35 | 8.5 | 10.3 |
| 9 | " | 45 | 30 | 31.91 | 0.905 | 31.76 | 0.775 | 0.5 | 14.4 |
| 10 | " | 45 | 100 | 31.70 | 1.35 | 31.65 | 1.275 | 0.2 | 5.5 |
| 11 | Zeolite X* | 35 | 30 | 32.97 | 0.76 | 27.25 | 0.03 | 17.35 | 96.1 |
| 12 | " | 35 | 100 | 32.55 | 0.915 | 24.86 | 0.51 | 23.62 | 44.3 |
| 13 | Zeolite Y* | 35 | 30 | 33.88 | 0.665 | 30.25 | 0.215 | 10.71 | 67.6 |
| 14 | " | 35 | 100 | 33.67 | 0.745 | 29.48 | 0.515 | 12.44 | 30.8 |
| 15 | Zeolite A* | 50 | 30 | 31.58 | 1.445 | 29.98 | 0.07 | 5.06 | 95.1 |
| 16 | " | 50 | 30 | 31.73 | 1.545 | 30.34 | 0.13 | 4.38 | 91.58 |
| 17 | " | 50 | 100 | 31.24 | 1.87 | 29.79 | 0.55 | 4.64 | 70.58 |
| 18 | Zeolite 3A-A | 50 | 30 | 34.0 | 0.535 | 32.69 | 0.045 | 3.85 | 91.6 |
| 19 | " | 50 | 100 | 32.35 | 1.32 | 29.85 | 0.175 | 7.72 | 86.7 |
| 20 | Zeolite 4A-A | 50 | 30 | 33.09 | 0.89 | 27.66 | 0.025 | 16.4 | 97.19 |
| 21 | " | 50 | 100 | 32.16 | 1.54 | 28.14 | 0.305 | 12.5 | 80.2 |
| 22 | Zeolite 5A-A | 50 | 30 | 33.52 | 0.70 | 25.67 | 0.34 | 23.4 | 51.4 |
| 23 | " | 50 | 100 | 32.93 | 1.355 | 25.71 | 0.755 | 21.9 | 44.2 |
| 24 | Comparison silica gel | 50 | 30 | 32.15 | 0.95 | 25.88** | 0.025 | 19.5 | 97.4 |
| 25 | Dried at 120° C. | 50 | 100 | 32.79 | 1.295 | 30.25** | 0.22 | 7.74 | 83.0 |
| 26 | Activated Carbon | 25 | 30 | 32.13 | 0.865 | 25.23** | 0.69 | 21.5 | 20.23 |
| 27 | dried at 120° C. | 25 | 100 | 32.93 | 1.16 | 28.59** | 1.05 | 13.17 | 9.48 |
| 28 | Zeolite A* After | 50 | 30 | 30.39 | 1.19 | 29.87 | 0.065 | 1.71 | 94.53 |
| 29 | Regeneration 400° C./air | 50 | 100 | 33.80 | 0.88 | 31.66 | 0.245 | 6.33 | 72.2 |
| 30 | Zeolite A* After Regeneration/ Muffle furnace | 50 | 30 | 32.43 | 1.26 | 31.89 | 0.26 | 1.66 | 79.3 |
| 31 | Zeolite A* After Regeneration/ vacuum | 50 | 30 | 34.15 | 0.66 | 33.90 | 0.22 | 0.73 | 66.6 |
| 32 | Zeolite A* After Regeneration/CH₄/ 200° C. | 40 | 30 | 25.40 | 0.575 | 24.96 | 0.11 | 1.73 | 80.1 |
| 33 | Zeolite A* After Regeneration/H₂/ 200° C. | 40 | 30 | 32.55 | 0.96 | 32.82 | 0.315 | 0 | 67.2 |

**Polymerization on Surface

The industrial advantage of the process of the invention first is in the possibility of being able to again use the ammonia originally employed in an exceptionally favorable manner, so that the reaction of ammonia to hydrogen cyanide is almost quantitative, without the occurrence of polymerization of the hydrogen cyanide which is observed with the use of other adsorption agents such as activated carbon or silica gel. Through this for the first time there is made possible an industrially simple adsorption process for the separation of ammonia from hydrogen cyanide containing gases.

Besides the process is favorable to the environment since ammonia neither escapes into the atmosphere nor must be changed to undesired products such as ammonium sulfate.

For the BMA process, however, it is especially essential that the purification step can be built into the already existing plants for the production of hydrogen cyanide simply and without problem.

The entire disclosure of German priority application No. P2947498.4-41 is hereby incorporated by reference.

What is claimed is:

1. In a process for the production of hydrogen cyanide in a reaction furnace according to the BMA process, or a process identical to the BMA process except that a hydrocarbon other than methane is employed, the improvement comprising bringing the product gas leaving the reaction furnace and consisting essentially of hydrogen cyanide, hydrogen, unreacted hydrocarbon and ammonia as well as small amounts of nitrogen and carbon monoxide and optionally water into contact with a zeolite to adsorb ammonia and recovering the adsorbed ammonia by desorption.

2. A process according to claim 1 wherein the hydrocarbon has 1-4 carbon atoms.

3. A process according to claim 2 wherein the adsorption is carried out at a temperature of 20°-200° C.

4. A process according to claim 3 wherein the adsoprtion is carried out at 30°-100° C.

5. A process according to claim 4 wherein the desorption of the absorbed ammonia is carried out at a higher temperature than the adsorption temperature, the desorption temperature being 200°-400° C. and the desorption is carried out at a pressure of 0.01-0.3 bar abs.

6. A process according to claim 5 wherein a flushing gas is passed through during the desorption.

7. A process according to claim 6 wherein the flushing gas is air, nitrogen, hydrogen or a hydrocarbon.

8. A process according to claim 3 wherein the desorption of the absorbed ammonia is carried out at a higher temperature than the adsorption, the desorption temperature being 40°–400° C.

9. A process according to claim 8 wherein the desorption temperature is 200°–400° C.

10. A process according to claim 2 wherein a flushing gas is passed through during the desorption of the absorbed ammonia.

11. A process according to claim 10 wherein the flushing gas is air, nitrogen, hydrogen or hydrocarbon.

12. A process according to claim 11 wherein the flushing gas is the same hydrocarbon used as starting material to form hydrogen cyanide.

13. A process according to claim 12 wherein the desorbed ammonia is returned to the step of forming hydrogen cyanide from the hydrocarbon and ammonia.

14. A process according to claim 2 wherein there is employed as the zeolite a zeolite of the structural type A, X, Y or P or natural zeolite.

15. A process according to claim 14 wherein the zeolite is a zeolite of type A or X.

16. A process according to claim 15 wherein the zeolite is a zeolite of type A.

17. A process according to claim 14 wherein there is employed a zeolite of structural type A, X, Y, P, mordenite, clinoptilolite or erionite.

18. A process according to claim 2 wherein the hydrocarbon is an alkane.

19. A process according to claim 18 wherein the alkane is methane.

20. A process according to claim 2 comprising condensing the HCN content of the product gas after the removal of ammonia.

21. A process according to claim 20 wherein prior to condensing the product gas there are removed residual traces of ammonia by washing.

22. A process according to claim 2 wherein the desorption of the absorbed ammonia is carried out at a lower pressure than the adsorption, the pressure being 0.001–1 bar abs.

23. A process according to claim 22 wherein the pressure during the desorption is 0.01–0.3 bar abs.

24. A process according to claim 2 wherein the desorption of the absorbed ammonia is carried out at a higher temperature than the adsorption, the desorption temperature being 40°–400° C.

25. A process according to claim 2 comprising condensing the ammonia from the desorption mixture and reusing the ammonia as ammonia for the synthesis of hydrogen cyanide.

* * * * *